United States Patent
Barnes et al.

(10) Patent No.: US 10,311,030 B1
(45) Date of Patent: Jun. 4, 2019

(54) METHOD AND SYSTEM FOR IMPLEMENTING AN AUTOMATED MIGRATION TOOL

(71) Applicant: JPMorgan Chase Bank, N.A., New York, NY (US)

(72) Inventors: James Todd Barnes, Katy, TX (US); Farhan Ahmed, Houston, TX (US); Chandrasekharan N. Mana, Hoffman Estates, IL (US); Ajay K. Gupta, Houston, TX (US); Rahul D. Kulkarni, Katy, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 15/587,849

(22) Filed: May 5, 2017

(51) Int. Cl.
*G06F 8/71* (2018.01)
*G06F 16/21* (2019.01)
*G06F 16/27* (2019.01)

(52) U.S. Cl.
CPC .............. *G06F 16/214* (2019.01); *G06F 8/71* (2013.01); *G06F 16/27* (2019.01)

(58) Field of Classification Search
CPC ..... G06F 8/00; G06F 8/70; G06F 8/71; G06F 8/73; G06F 8/76; G06F 8/77; G06F 9/4856–9/4875; G06F 9/4881; G06F 9/5088; G06F 17/30079–17/30082; G06F 17/303; G06F 17/30557–17/30584; G06F 2009/4557; G06F 3/0647; G06F 16/119; G06F 16/178–16/1794; G06F 16/185; G06F 16/214; G06F 16/27–16/28; G06Q 10/06

USPC ......... 700/100–103; 705/7.11; 707/609–686; 717/100–103
See application file for complete search history.

(56) References Cited

U.S. PATENT DOCUMENTS

| | | | |
|---|---|---|---|
| 9,298,752 B2 * | 3/2016 | Do | G06F 17/303 |
| 9,641,534 B2 * | 5/2017 | Lindley | H04L 63/10 |
| 9,747,098 B2 * | 8/2017 | Hayward Schaefer | G06F 8/71 |

(Continued)

OTHER PUBLICATIONS

Anonymous, Gerrit Code Review—Access Controls, GoogleSource [online], 2014 [retrieved Apr. 15, 2018], Retrieved from Internet: <URL: https://web.archive.org/web/20140903190152/https://gerrit-review.googlesource.com/Documentation/access-control.html>, pp. 1-16.*

(Continued)

*Primary Examiner* — Todd Aguilera
(74) *Attorney, Agent, or Firm* — Hunton Andrews Kurth LLP (57) ABSTRACT

An embodiment of the present invention is directed to an automated migration tool. A system that implements an automated migration tool comprises: a memory component; an interactive web-based interface; and an application server configured to perform the steps comprising: submit a request for source code migration from a source platform to a target platform; schedule the migration for a time period; upon approval of the migration for the time period, identify the source code and associated metadata for migration, wherein the metadata comprises history data, code reviews and permissions; execute the migration of the source code and the associated metadata from the source platform to the target platform; and perform validation of the migration.

20 Claims, 4 Drawing Sheets

(56) References Cited

U.S. PATENT DOCUMENTS

| | | | | |
|---|---|---|---|---|
| 9,891,947 B2* | 2/2018 | Gilbert | ................ | G06F 9/45558 |
| 2011/0289054 A1* | 11/2011 | Johnson | ................ | G06F 21/604 |
| | | | | 707/626 |
| 2015/0058289 A1* | 2/2015 | Do | ........................ | G06F 17/303 |
| | | | | 707/613 |
| 2017/0070505 A1* | 3/2017 | Lindley | ................ | G06F 3/0647 |
| 2017/0132556 A1* | 5/2017 | Dobinson | ...... | G06Q 10/063114 |
| 2017/0220337 A1* | 8/2017 | Hayward Schaefer | ... | G06F 8/68 |
| 2017/0242724 A1* | 8/2017 | Gilbert | ................ | G06F 9/45558 |

OTHER PUBLICATIONS

Anonymous, "Hyperlinking to source code in Bitbucket", Atlassian [online], 2016 [retrieved Apr. 16, 2018], Retrieved from Internet: <URL: https://web.archive.org/web/20161106060920/https://confluence.atlassian.com/bitbucket/hyperlinking-to-source-code-in-bitbucket-824476709.html>, pp. 1-3.*

\* cited by examiner

METHOD AND SYSTEM FOR IMPLEMENTING AN AUTOMATED MIGRATION TOOL

FIELD OF THE INVENTION

The present invention generally relates to a migration tool and more specifically to an automated migration tool that migrates source code and underlying metadata from a source platform to a target platform.

BACKGROUND OF THE INVENTION

Many companies utilize a firmwide source code management (SCM) platform named BITBUCKET® (by ATLASSIAN®) which currently does not have the ability to migrate from its legacy platform STASH™ (by ATLASSIAN®). In addition, the underlying source code's history and metadata cannot be moved to a new strategic platform nor consolidated.

Currently, there are no vendor solutions to handle the migration task. The underlying projects and repositories (and their associated history) cannot be moved or consolidated with the current system. As a result, companies are required to perform a manual, labor intensive procedure to transfer source code data to the newer platform.

These and other drawbacks exist.

SUMMARY OF THE INVENTION

Accordingly, one aspect of the invention is to address one or more of the drawbacks set forth above. According to an embodiment of the present invention, an automated computer implemented system that implements an automated migration tool of source code and associated metadata comprises: a memory component; an interactive web-based interface that receives one or more user inputs; and an application server comprising a processor, coupled to the memory component and the interactive interface, the application server configured to perform the steps comprising: submit a request for source code migration from a source platform to a target platform; schedule the migration for a time period; upon approval of the migration for the time period, identify the source code and associated metadata for migration, wherein the metadata comprises history data, code reviews and permissions; execute the migration of the source code and the associated metadata from the source platform to the target platform; and perform validation of the migration.

According to another embodiment of the present invention, an automated computer implemented method that implements an automated migration tool comprises the steps of: submitting, via interactive web-based interface, a request for source code migration from a source platform to a target platform; scheduling, via an application server, the migration for a time period; upon approval of the migration for the time period, identifying the source code and associated metadata for migration, wherein the metadata comprises history data, code reviews and permissions; executing, via the application server, the migration of the source code and the associated metadata from the source platform to the target platform; and performing, via the application server, validation of the migration.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An Automated Migration Tool is directed to migrating source code and related metadata from a legacy platform, such as Atlassian Stash, to a target platform, such as Atlassian BitBucket. An embodiment of the Automated Migration Tool may analyze a project and repository on a legacy platform and move source code, permissions, and a consolidated pull request history to the new platform. The Automated Migration Tool provides administrators with running logs as to the detail of the migration, errors and/or failures, and a successful message upon completion. The Automated Migration Tool may also provide a reporting function, an analytics function and/or other functionality.

An embodiment of the present invention moves a full copy of projects and repositories. In this exemplary embodiment, the Automated Migration Tool may choose to not delete the source data to ensure if there are issues, the original content is preserved for auditing purposes. The process may be re-run at any time to specified multiple target servers, thereby creating full historical copies across the infrastructure platform.

The Automated Migration Tool may be incorporated in a vendor's software platform to provide infrastructure consolidation and migration capabilities.

An embodiment of the present invention is directed to migrating source code and related data from a legacy platform, such as a GIT™ repository management for enterprise teams, to a target platform, such as a web-based hosted service for source code and development projects with revision control systems. The legacy platform may represent a central, secure solution to create and manage distributed repositories on a company's own servers. The legacy platform may further provide a way to structure repositories and manage permissions. The legacy platform may also organize repositories by projects (e.g., logical and practical organization of repositories). The target platform may represent a distributed version control system. The target platform may further provide code collaboration to enable more efficient approval of code review. The target platform may further provide flexible deployment models and unlimited private and public repositories. The target platform may provide secure workflows by controlling actions users can perform with branch permissions at the project, repository or branch level. An embodiment of the present invention may provide migration capabilities from one GIT™-based tool to another GIT™-based tool. Other variations and migrations of source code may be implemented.

An embodiment of the present invention addresses the situation where a company with hundreds or thousands of repositories at stake seeks to migrate source code with underlying metadata (e.g., code requests, code reviews, data relevant to software development, etc.) from a legacy platform to a target platform. Currently, there is no solution for this specific migration of source code and associated data. Traditional systems require a manual, error-prone, approach that is simply not practical for a company with hundreds or thousands of repositories storing and maintaining source code and other data vital and relevant to daily operation, maintenance and management.

An embodiment of the present invention is directed to migrating source code and underlying metadata which includes history data, code reviews, approvals, comments, users and permissions as well as performing underlying validations from the source to the target to ensure that relevant dependencies are captured and migrated with the underlying source code. Accordingly, the Automated Migration Tool ensures that data relevant and necessary to the software development process and audit perspective are captured and migrated to a target platform. The Automated Migration Tool analyzes the source platform and the target platform and generates a complete log of actions that are being performed and provides any errors, discrepancies, issues, inconsistencies, etc. for a final validation.

An embodiment of the present invention is directed to large-scale migrations with hundreds and thousands of repositories with many projects and teams. An individual may be part of several projects with different permissions, roles and responsibilities for each project. For example, a program manager may have 10 projects with different permissions for each of those 10 projects.

The Automated Migration Tool of an embodiment of the present invention enables projects and teams to schedule and perform migration in an efficient, flexible and convenient manner. For example, a team may be devoted to rolling out a new system and therefore cannot stop work to verify that relevant source code has been migrated properly. The Automated Migration Tool enables individual teams to schedule a migration at a convenient and non-disruptive schedule. Because the source code is migrated with relevant and associated metadata, the Automated Migration Tool enables different teams—that even work or collaborate together—to schedule source code migration at different, more convenient, times and schedules.

According to an embodiment of the present invention, the Automated Migration Tool may initiate an approval process with an internal request system. For example, a project owner may verify a migration on a particular day (or time range). The project owner may interact with the Automated Migration Tool via an interactive user interface. The user interface may be available on various devices, such as a computer, tablet, mobile device, phone, kiosk, terminal, etc. The user may provide a source platform and a target platform. In addition, the source and target data may be automatically generated by the system, based on the project, user identification, etc.

The Automated Migration Tool may then perform an analysis of the underlying source code and identify tags, branches and other types and forms of metadata. The Automated Migration Tool may further identify and/or analyze underlying ties, links, hyperlinks and/or other associated data. In addition, the Automated Migration Tool may identify and/or analyze configuration data and special hooks and programs that are accessed and/or required by the source code. For example, before code is committed, certain validations may need to be met—such data may also be identified and analyzed for migration. The Automated Migration Tool also migrates underlying users, permissions, authorizations, etc. Accordingly, when the migration occurs, the users that were able to work against in the code in the source platform may continue to work on the code in the target platform, without any disruptions or requirements for configuration or installation.

Figure 1:
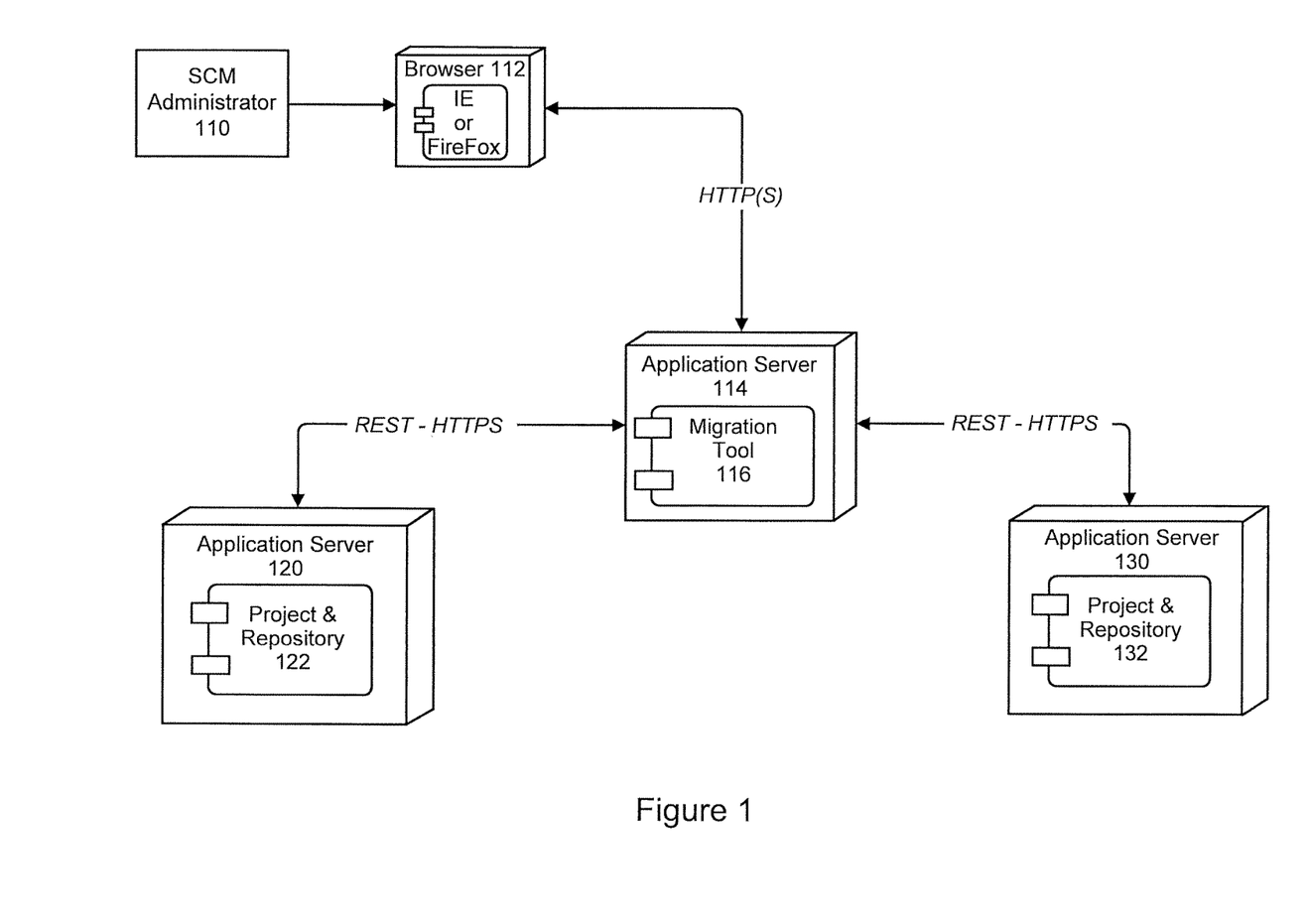
FIG. 1 is a system deployment architecture for an Automated Migration Tool, according to an embodiment of the present invention.

FIG. 1 is a system deployment architecture for an Automated Migration Tool, according to an embodiment of the present invention. A user, such as a Source Code Management (SCM) user, represented by 110, may access the system via a browser or other interface, as shown by 112. Browser 112 may communicate with Application Server 114 that implements a Migration Tool 116. As shown in FIG. 1, communication may occur via Hypertext Transfer Protocol (HTTP). Migration Tool 116 may communicate between Application Server 120 with a corresponding Project and Repository 122 and Application Server 130 with a corresponding Project and Repository 132. Application Server 120 may represent a legacy platform and Application Server 130 may represent an updated platform. As shown in FIG. 1, communication may occur via REST-HTTPs. Other communication protocols may be implemented.

FIG. 1 illustrates a schematic diagram of a system that implements an Automated Migration Tool, according to an exemplary embodiment. As illustrated in FIG. 1, Network may be communicatively coupled with one or more data devices including, for example, computing devices associated with end users. Such devices may include mobile devices, including mobile phones, smart devices, etc. Migration Tool 116 may also incorporate modules and other functions. These modules are exemplary and illustrative, Migration Tool 116 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Application Server may be coupled to storage components, such as repositories, database, data stores, etc. These storage components may include any suitable data structure to maintain the information and allow access and retrieval of the information. For example, the storage components may keep the data in an organized fashion and may be an ORACLE® database, a MICROSOFT® SQL Server database, a DB2 database, a MYSQL® database, a SYBASE® database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, or communications may involve a direct connection between the various storage components, as depicted in FIG. 1. The storage components may also represent cloud or other network based storage.

The system of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

Communication between components in system 100 may be a wireless network, a wired network or any combination of wireless network and wired network. For example, system 100 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, system 100 may support an Internet network, a wireless communication network, a cellular network, BLUETOOTH®, or the like, or any combination thereof. System 100 may further include one, or any number of the exemplary types of networks mentioned above operating as a stand-alone network or in cooperation with each other. System 100 may utilize one or more protocols of one or more network elements to which it is communicatively coupled. System 100 may translate to or from other protocols to one or more protocols of network devices. System 100 may comprise a plurality of interconnected networks, such as, for example, a service provider network, the Internet, a cellular network, corporate networks, or even home networks, or any of the types of networks mentioned above.

Data may be transmitted and received via communication links utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Users may communicate using any mobile or computing device, such as a laptop computer, a personal digital assistant, a smartphone, a smartwatch, smart glasses, other wearables or other computing devices capable of sending or receiving network signals.

Figure 2:
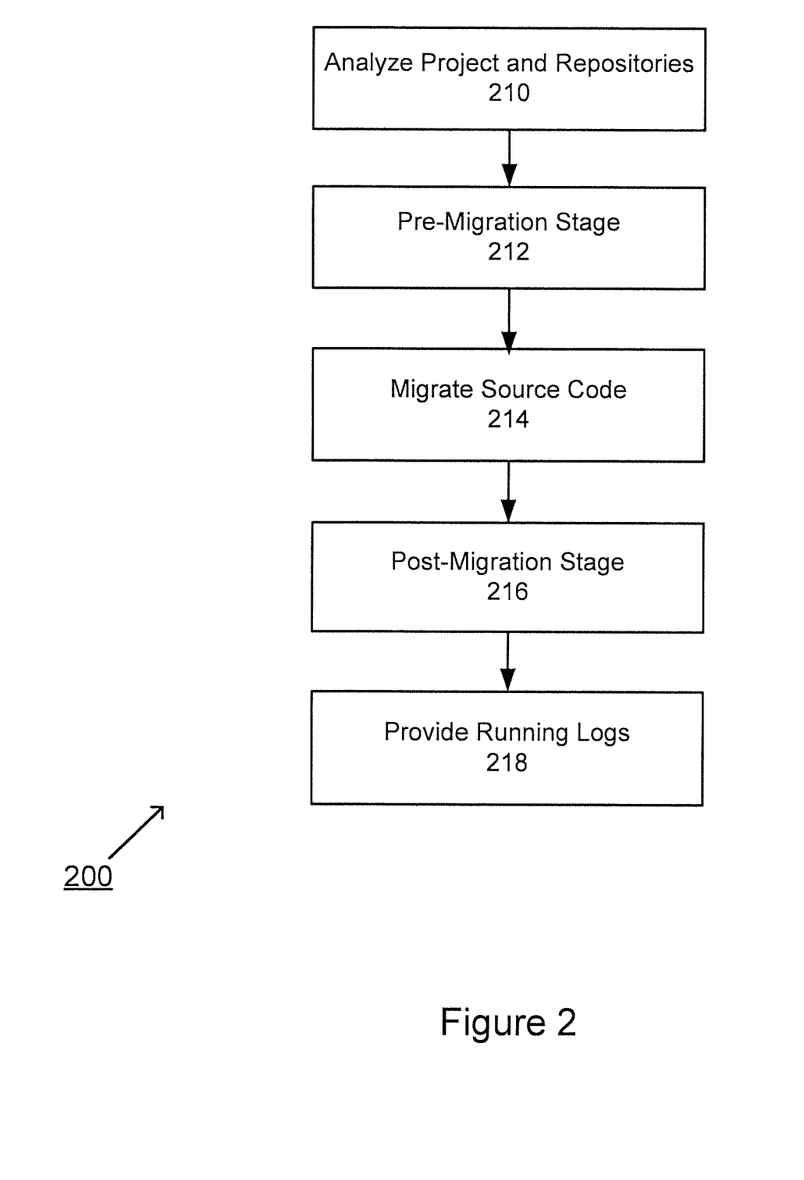
FIG. 2 is an exemplary flowchart of a method for implementing an Automated Migration Tool, according to an embodiment of the present invention.

FIG. 2 is an exemplary flowchart of a method for implementing an Automated Migration Tool, according to an embodiment of the present invention. At step 210, project and repositories may be analyzed by the Automated Migration Tool. At step 212, a pre-migration stage may be performed. At step 214, source code may be migrated. At step 216, a post-migration stage may be performed. At step 218, the Automated Migration Tool may provide running logs. The order illustrated in FIG. 2 is merely exemplary. While the process 200 of FIG. 2 illustrates certain steps performed in a particular order, it should be understood that the embodiments of the present invention may be practiced by adding one or more steps to the processes, omitting steps within the processes and/or altering the order in which one or more steps are performed. The steps of FIG. 2 are explained in further detail below.

At step 210, project and repositories may be analyzed by the Automated Migration Tool. For example, a company may manage hundreds or thousands of repositories where repositories are organized by projects (e.g., logical and practical organization of repositories). The company may seek to migrate source code with underlying metadata (e.g., history data, code requests, pull requests, code reviews, data relevant to software development, etc.) from a legacy platform to a target platform. The Tool may identify, organize and format source code and associated metadata for migration to a target platform.

At step 212, a pre-migration stage may be performed. An embodiment of the present invention may confirm a request for migration as well as ensure approvals are in place from teams that are currently using the source platform. In the exemplary application of migrating from Stash to Bit Bucket, the Tool may create a Bit Bucket Project in DEV xChange (or other format). The Tool may also approve downtime for migration. Project Migration downtime may depend on various factors, such as number of repositories in a project, size of the repositories, etc. For example, a regular size of repository (e.g., 100 MB) may take a few minutes to migrate to a target platform. The Tool may ensure Pull Requests are complete before migration. A Pull Request may inform others about changes that have been pushed to a repository. For example, once a pull request is sent, interested users may view the set of changes, discuss potential modifications and further push follow-up commits. Pull requests let developers notify team members that a feature (or other task) has been completed. Once a feature branch is ready, a developer may file a pull request which informs interested users that they need to view the code and merge it into a master branch. The Pull request may provide a dedicated form for discussing the proposed feature. If issues or problems arise, interested users may post feedback in the pull request and even modify or propose updates by pushing follow-up commits. This activity may be tracked directly inside of the pull request.

At step 214, source code may be migrated. Further details are described in connection with FIG. 3 below.

At step 216, a post-migration stage may be performed. The source platform project may be renamed to <sourceplatformprojectname>_migrated and may be available on a read-only basis for a short-time after migration to the target platform is completed. The Tool may further validate permissions after migration in the target platform to ensure users have project level permission. For example, the Tool may enable permissions (e.g., in DEV xChange) and ensure mapping target platform roles are correct. The Tool may also validate the source code after migration. The Tool may further validate pull request logs and audit logs in the project repository (e.g., audit-and-pull-request-from-old-source platform-YYYY-MM-DD). If applicable, the Tool may submit a request to have Functional account(s) added to the target platform project. The Tool may also add a Functional account (FID) to a migration project. For example, the Tool may update the target platform project or user profile with existing SSH key (public and private) and/or to generate SSH Key and configure SSH access to GIT™ repositories in the target platform project. The Tool may further review and/or update Hook configurations using GIT™ repositories in the original source platform project for reference.

If applicable, the Tool may update source platform plugin configurations. If applicable, the Tool may update GIT™ repo-level permissions using the source platform project for reference. The Tool may enable users to sign-off on migration and approve deletion of the project from source platform standalone instances.

At step 218, the Automated Migration Tool may provide running logs. For example, running logs may provide details of the migration, detected errors and/or failures, a successful migration, validation results, status data, progress data, etc.

Figure 3:
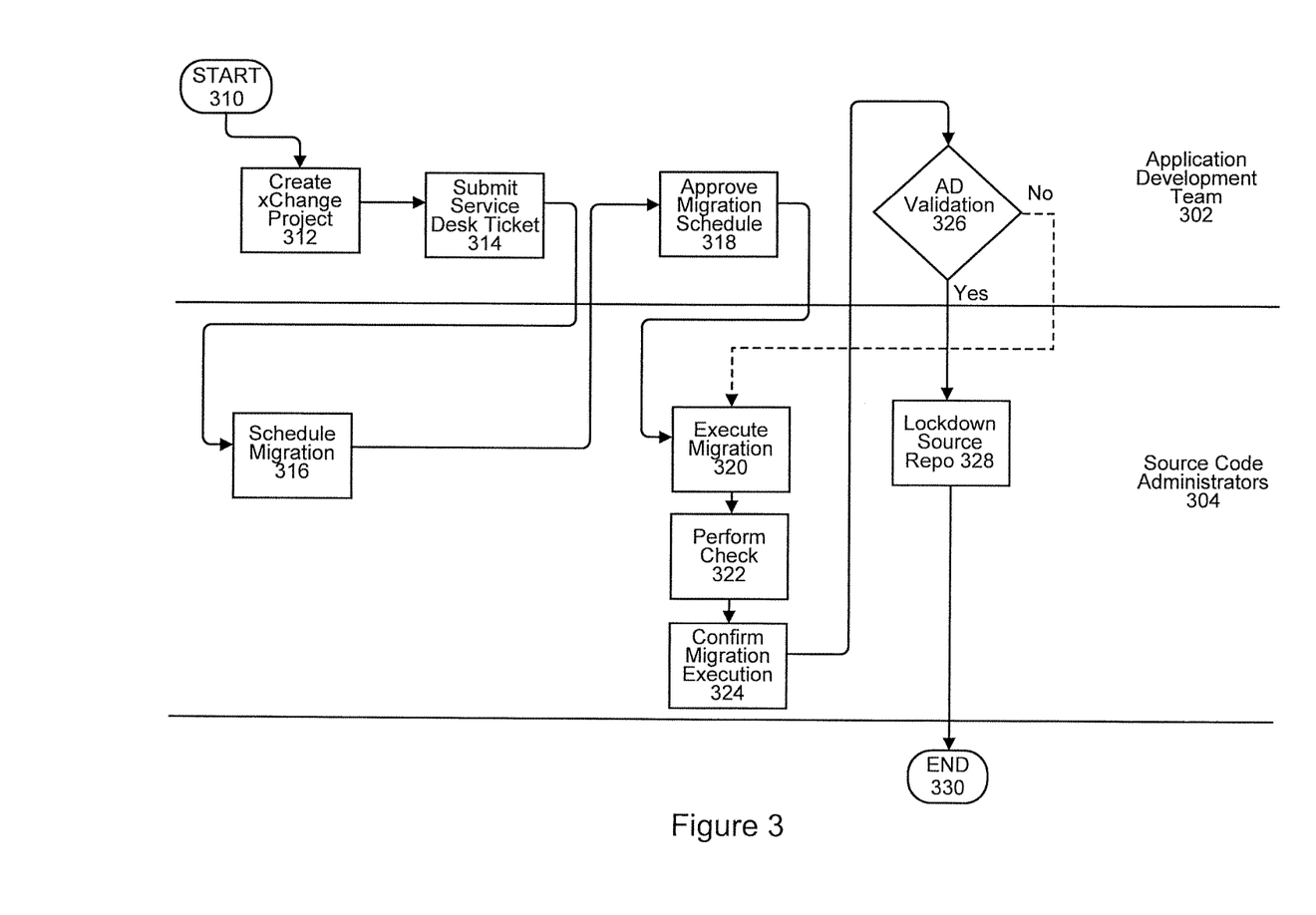
FIG. 3 is an exemplary flowchart of a method for implementing an Automated Migration Tool, according to an embodiment of the present invention.

FIG. 3 is an exemplary flowchart of a method for implementing an Automated Migration Tool, according to an embodiment of the present invention. An exemplary process may start at 310. The steps illustrated in FIG. 3 demonstrate the interactions between Application Development Team 302 and Source Code Administrators 304. At step 312, a project may be created. At step 314, a service desk ticket may be submitted. At step 316, a migration may be scheduled. At step 318, a migration schedule may be approved. Upon approval, a migration may be executed at step 320. A check may be performed at step 322. At step 324, migration execution may be confirmed. At step 326, an Application Development (AD) validation may be performed. If validation is successful, a lockdown on source repository may be performed at step 328. If validation is not successful, the process may return to migration execution at step 320. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. The steps of FIG. 3 are explained in further detail below.

At step 312, a project may be created. The project may represent a migration project created by a project owner on a target platform instance. This may occur via FAST xChange.

At step 314, a service desk ticket may be submitted.

At step 316, a migration may be scheduled. The Tool may raise a request for migration and/or ensure approvals are in place. The Tool may create a target platform Project in FAST xChange or other format. For example, a Same Project Key in the target platform should not be used as it used in source platform-production servers. The Tool may confirm approval for downtime for migration. The Tool may ensure Pull Requests are complete before migration. Pull requests made after the migration start may be added to the target platform after the migration. The Tool may validate permissions before migration in the target platform and ensure users have project level permission.

At step 318, a migration schedule may be approved. As part of the Migration or Projects and Repositories action, in order to preserve current pull request information as well as all Project and Repositories level Audits from the source project, the Tool may create a new repository to hold the information. The new repository may be called audit-and-pull-request-from-old-source platform-YYYY-MM-DD and may have Pull Request and Audit files for all repositories and project in the form of XML files, for example, named after the project Key and repository key for repository level information.

Upon approval, a migration may be executed at step 320.

The migration may involve sending a communication (e.g., an email, text, chat, etc.) to a requester (e.g., AD-Team representative, etc.); receiving a cutoff time from the team for migration (e.g., total migration time may depend on factors, including number of repos, size and number of revisions, etc.); executing a Migration Utility; and attaching a log file.

After migration has been completed, an embodiment of the present invention may rename a source platform Project Key with PROJECT MIGRATED and make it Read only for all (or a subset) users at the project level.

Post-migration steps may include renaming a source platform project Key to sourceplatformprojectkey_MIGRATED and implementing a read-only lock down. Also, a JIRA ticket number may be added in the Description Field Change permissions to "Read" for user accounts on the sourceplatformproject_MIGRATED at project level and GIT™ repository level (as applicable).

By default, the Automated Migration Tool may rename a target platform project name to match the source platform project name. The Tool may change the target platform project name to match the source platform project name after migration is complete. Also, the Tool may rename the target platform project name back to original name when both source platform and target platform migration have been completed. This may involve migrating projects and repositories and migrating permissions. For example, a xChange project associated with the target platform project may include an identifier (e.g., URL) to the target platform project KEY, not the target platform project NAME, therefore the target platform project name change may have no effect on an associated xChange project.

The Tool may keep the source platform Project on the source platform Server as marked _MIGRATED and add the JIRA ticket number in the old source platform Project Description Filed. Also, the Tool may update to reflect that standard policy is to leave the sourceplatformproject_MIGRATED project online locked-down for read-only access.

The Tool may add a Service Desk JIRA ticket number to the source platform Project Description and mark the Service Desk Ticket Migrated. The Tool may maintain old projects with <PROJECT_KET_MIGRATED> for tracking purpose.

A check may be performed at step 322. The check may involve verifying (at a higher level) the migration and/or execution process. Various levels of granularity may be performed.

At step 324, migration execution may be confirmed. The Tool may close the Service Desk ticket once AD-Team confirms the migration. An embodiment of the present invention is directed to migrating project and repository data using an automation method, where details of the process is documented for audit purposes.

At step 326, an Application Development (AD) validation may be performed. The Tool may validate permissions after migration in the target platform. The Tool may enable permissions in FAST xChange and ensure mapping target platform Roles are correct. The Tool may further validate the source code after migration For example, the Tool may validate pull request logs and audit logs. The Tool may sign-off on migration and approve deletion of project from Stash standalone instances.

An embodiment of the present invention may provide additional validation steps and validation outputs.

If validation is successful, a lockdown on source repository may be performed at step 328.

If validation is not successful, the process may return to migration execution at step 320. The process may end at 330.

Figure 4:
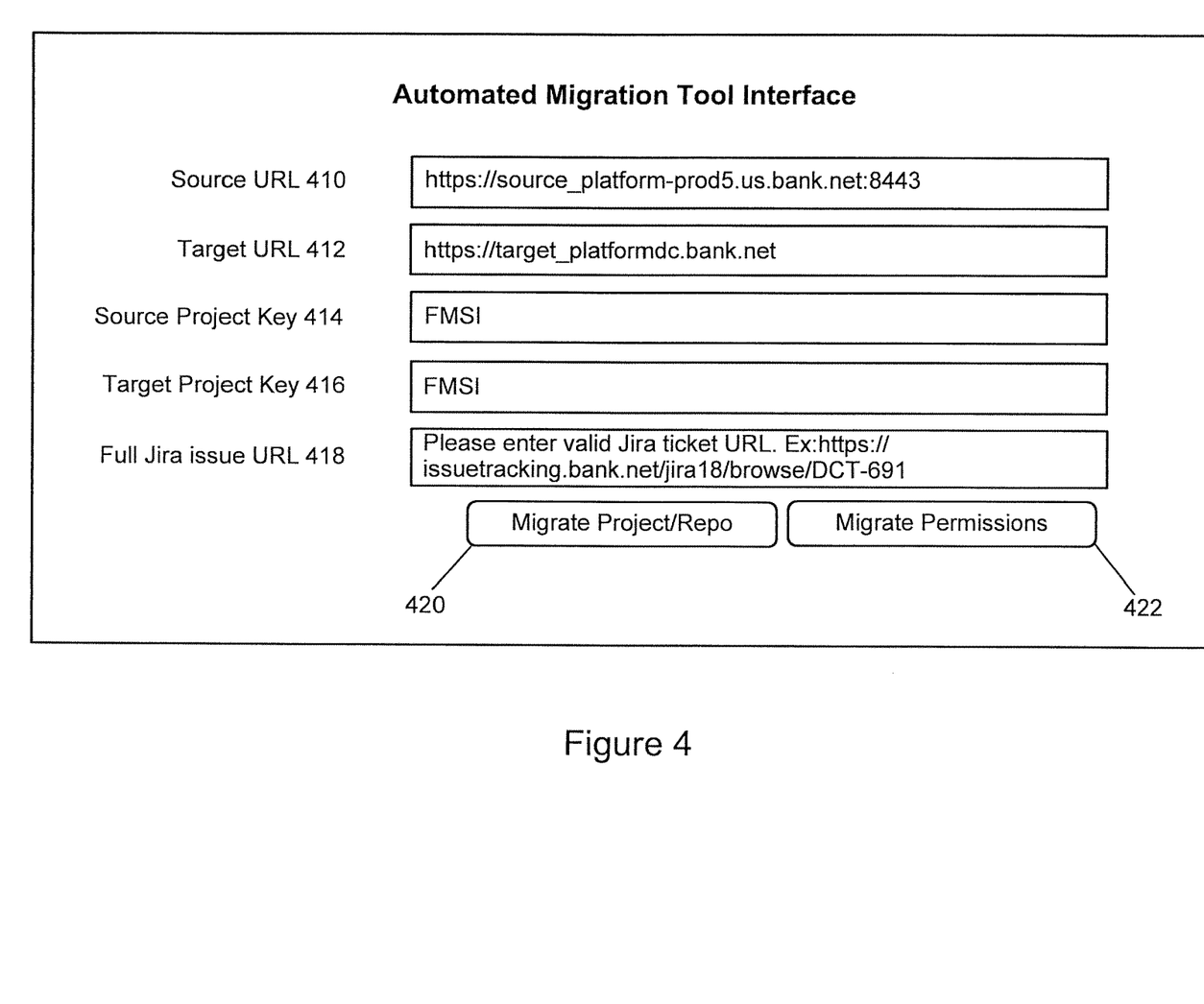
FIG. 4 illustrates an exemplary interactive interface of an Automated Migration Tool, according to an embodiment of the present invention.

FIG. 4 illustrates an exemplary interactive interface, according to an embodiment of the present invention. As indicated, the interactive interface initiates migration of projects, repositories, users, permissions and repository data with branches and commit history from a source instance to a target instance for a project key. In this example, a user may enter a source platform URL at 410 and a target platform URL at 412. The interface may also enter a source project key at 414 from a source server and target project key at 416 from a target server. A full JIRA issue URL may be provided at 418.

The Automated Migration Tool may initiate a migration of projects and repositories at 420 and migration of permissions at 422. As the name indicates, Migrate Project/Repository 420 migrates project, repositories, repository data, pull requests for repositories and audit logs for both projects and repositories. Migrate Permissions 422 migrates project and repository level permissions. Once the source platform project is ready to be migrated to the target platform, the Tool retrieves the source platform project URL including the project key from the project owners.

Migrate Projects and Repositories 420 represents a first step as the Tool migrates the projects and repositories first and therefore needs to make sure it is validated before turning over to actual users. Once Migrate Projects and Repositories 420 is completed, validation of project, repos, repository data and hooks configurations are in place. Once validated, the Tool may migrate permissions by initiating Migrate Permissions 422.

An embodiment of the present invention may provide a results page. In an exemplary results page, Application logs pertaining to a particular action thread may be refreshed periodically and may be scrollable to the top of the page. For example, a completed log file may be downloaded to local file system using Download Log File button, which may include logs from other threads if running in parallel. The migration log file may be attached to the JIRA ticket used for this migration once the migration is completed. After the Migration has been completed, the Tool may rename the old source platform Project with PROJECT_NAME_MIGRATED. Also, the Tool may delete the PROJECT_NAME_MIGRATED from the old source platform server after a predetermined period of time (e.g., two weeks, etc.) of migration or as soon as the migration is completed. The Tool may then close the JIRA ticket.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a BLUETOOTH® radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented method that implements an automated migration tool comprises the steps of:
    submitting, via interactive web-based interface, a request for source code migration from a source platform to a target platform;
    scheduling, via an application server, the migration for a time period;
    upon approval of the migration for the time period, identifying the source code and associated metadata for migration, wherein the metadata comprises history data, code reviews, underlying links, configuration data, and permissions;
    executing, via the application server, the migration of the source code and the associated metadata from the source platform to the target platform; and
    performing, via the application server, validation of the migration, the validation comprises validating the permissions to ensure project level permissions have been migrated and validating pull request logs and audit logs.

2. The method of claim 1, wherein the source platform comprises a Git repository management system.

3. The method of claim 1, wherein the target platform represents a web-based hosted service for source code and development projects.

4. The method of claim 1, wherein the interactive web-based interface is configured to receive a source project key and a target project key.

5. The method of claim 1, wherein the migration further comprises migration of associated repositories from the source platform to the target platform.

6. The method of claim 1, further comprising the step of:
    generating a log of actions that are performed during the migration.

7. The method of claim 1, wherein the metadata further comprises underlying links and hyperlinks associated with the source code.

8. The method of claim 1, wherein the interactive web-based interface comprises a migrate project and repository step and a migrate permissions step.

9. The method of claim 1, wherein the migration tool supports HTTPs communication.

10. The method of claim 1, wherein the validation comprises multiple validations of the source code.

11. An automated computer implemented system that implements an automated migration tool of source code and associated metadata, the system comprises:
- a memory component;
- an interactive web-based interface that receives one or more user inputs; and
- an application server comprising a processor, coupled to the memory component and the interactive interface, the application server configured to perform the steps comprising:
- submit a request for source code migration from a source platform to a target platform;
- schedule the migration for a time period;
- upon approval of the migration for the time period, identify the source code and associated metadata for migration, wherein the metadata comprises history data, code reviews, underlying links, configuration data, and permissions;
- execute the migration of the source code and the associated metadata from the source platform to the target platform; and
- perform validation of the migration, the validation comprises validating the permissions to ensure project level permissions have been migrated and validating pull request logs and audit logs.

12. The system of claim 11, wherein the source platform represents a Git repository management system.

13. The system of claim 11, wherein the target platform represents a web-based hosted service for source code and development projects.

14. The system of claim 11, wherein the interactive web-based interface is configured to receive a source project key and a target project key.

15. The system of claim 11, wherein the migration further comprises migration of associated repositories from the source platform to the target platform.

16. The system of claim 11, wherein the processor is further configured to perform:
- generate a log of actions that are performed during the migration.

17. The system of claim 11, wherein the metadata further comprises underlying links and hyperlinks associated with the source code.

18. The system of claim 11, wherein the interactive web-based interface comprises a migrate project and repository step and a migrate permissions step.

19. The system of claim 11, wherein the system supports HTTPs communication.

20. The system of claim 11, wherein the validation comprises multiple validations of the source code.

* * * * *